(12) United States Patent
Thomson et al.

(10) Patent No.: US 7,441,204 B2
(45) Date of Patent: Oct. 21, 2008

(54) METHOD AND SYSTEM FOR AUTOMATICALLY DISPLAYING CONTENT OF A WINDOW ON A DISPLAY THAT HAS CHANGED ORIENTATION

(75) Inventors: Michael James Thomson, Redmond, WA (US); Murtuza S. Naguthanawala, Sammamish, WA (US); Joseph N. Figueroa, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 737 days.

(21) Appl. No.: 10/773,598

(22) Filed: Feb. 6, 2004

(65) Prior Publication Data
US 2005/0177798 A1 Aug. 11, 2005

(51) Int. Cl.
*G06F 3/048* (2006.01)
(52) U.S. Cl. .................................... 715/827
(58) Field of Classification Search .......... 715/788, 715/786, 827
See application file for complete search history.

(56) References Cited

U.S. PATENT DOCUMENTS

| | | | | |
|---|---|---|---|---|
| 5,434,964 A | * | 7/1995 | Moss et al. | 715/788 |
| 6,297,795 B1 | * | 10/2001 | Kato et al. | 345/684 |
| 7,028,265 B2 | * | 4/2006 | Kuromusha et al. | 715/788 |
| 7,085,590 B2 | * | 8/2006 | Kennedy et al. | 455/556.1 |
| 2002/0196286 A1 | * | 12/2002 | Taylor et al. | 345/788 |
| 2005/0114788 A1 | * | 5/2005 | Fabritius | 715/767 |
| 2005/0179653 A1 | * | 8/2005 | Hamon | 345/156 |

OTHER PUBLICATIONS

Screen Dumps of East (1999, pp. 1-4).*
Osama Tolba et al.; "Pare Java-based Streaming MPEG Player"; *Multimedia Systems and Applications*; The International Society for Optical Engineering 1998; pp. 216-224.
Ken Hinckley et al.; "Sensing Techniques for Mobile Interaction"; *UIST Proceedings of the 13th Annual ACM Symposium on User Interface Software and Technology*; Association for Computing Machinery, Inc. 2000; pp. 91-100.

* cited by examiner

*Primary Examiner*—David Wiley
*Assistant Examiner*—Le Nguyen
(74) *Attorney, Agent, or Firm*—Merchant & Gould P.C.; Ryan T. Grace

(57) ABSTRACT

A method and system for automatically displaying content of a window on a display that has changed orientation is described. The content of a window, such as a dialog box, that has been authored for a particular size is repositioned and resized such that the window is viewable in its entirety when the display screen orientation is changed (e.g., from portrait to landscape.) A scroll bar is added to allow full access to content that is not visible within the display screen when necessary. Likewise, the scrollbar is removed when the scrollbar is no longer necessary in the new orientation. The repositioning and resizing of the window, as well as the addition or removal of the scrollbar occurs without interruption of other operating system applications.

14 Claims, 10 Drawing Sheets

```
hwnd:
window handle of the window wParam:
WMSCD_DIALOGSCROLLBAR - message used by the shell to add/remove
scrollbars on a display screen orientation change.

This will be defined in public\common\oak\inc\pwinuser.h as:
define WMSCD_DIALOGSCROLLBAR      0x02 lParam:
pCopyDataStruct = (COPYDATASTRUCT*) lParam
If pCopyDataStruct->dwData == TRUE the vertical scrollbar will be added
If pCopyDataStruct->dwData == FALSE the vertical scrollbar will be
removed prcClient = (RECT*) pCopyDataStruct->lpData
prcClient points to client rect of window in client coordinates that window
manager will use to compute the viewable area the end user will be able to
scroll to. The shell should use the client rect of the window before the shell
resizes the window.

Return Value:
TRUE if succeeded to remove/add the scrollbar
FALSE if failed to remove/add the scrollbar
Here is sample code that uses this message:
```

```
1000  hwnd = FindWindowThatNeedsToBeResizedBecauseOfScreenRotation();
      if(hwnd)
      {
1010      COPYDATASTRUCT    cds;
          GetClientRect(hwnd, &rcBuffer);
1020
1030   cds.dwData = TRUE;
1040   cds.cbData = sizeof(RECT);
       cds.lpData = &rcBuffer;

1050  // shrink the height by 80 pixels
      SetWindowPos(hwnd, 0, 0, 0, rcBuffer.right - rcBuffer.left,
      rcBuffer.bottom - rcBuffer.top - 80,
      SWP_NOZORDER|SWP_NOACTIVATE|SWP_NOMOVE);

1060  // use timeout in case app is hung
      lret = SendMessageTimeout(hwnd, WM_SYSCOPYDATA,
      WMSCD_DIALOGSCROLLBAR, (LPARAM)&cds, SMTO_NORMAL, 1000,
      &dw);
      }
```

*Fig. 10*

METHOD AND SYSTEM FOR AUTOMATICALLY DISPLAYING CONTENT OF A WINDOW ON A DISPLAY THAT HAS CHANGED ORIENTATION

BACKGROUND OF THE INVENTION

Personal pocket devices are becoming increasingly popular. Display screen rotation is becoming a common feature in many pocket devices. Display screen rotation allows a user to change the orientation of a display screen from vertical (i.e., portrait) to horizontal (i.e., landscape), and vice versa. When the orientation of the display screen is changed, content in a window, such as a dialog box, may not be visible. Thus, the user may not be able to access the full window in the new orientation. What is needed is a way to automatically display content of a window such that all of the content may be accessed when the display screen orientation is changed.

SUMMARY OF THE INVENTION

The present invention is directed at a method and system for automatically displaying content of a window on a display that has changed orientation. The method comprises: locating the window on the display having a first orientation; positioning the window such that a maximum portion of the window is visible on the display having a second orientation; sizing the window such that the window is visible on the display having the second orientation; determining if the window is entirely visible on the display having the second orientation; and if not, adding a scrollbar to the window such that the non-visible portions of the window are accessible.

The system comprises an automatic window adjustment mechanism that operates using shell and a window manager functions to automatically adjust window size, orientation, and features when an orientation change is initiated. The shell determines if the window is entirely visible in the new orientation. The shell positions and sizes the window if the window is not entirely visible in the new orientation. The window is positioned and sized to provide maximum visibility of the window in the new orientation. The window manager adds a scrollbar to the window if the window is not entirely visible in the new orientation after the window has been positioned and sized.

BRIEF DESCRIPTION OF THE DRAWINGS

FIG. 10 illustrates exemplary code for a mechanism to automatically display content of a window on a display that has changed orientation in accordance with the present invention.

DETAILED DESCRIPTION OF THE PREFERRED EMBODIMENT

Briefly stated, the present invention is directed to a method and system for automatically displaying content of a window on a display that has changed orientation. The content of a window, such as a dialog box, may have been authored for a particular size and position in a particular orientation (e.g., portrait). The present invention provides for repositioning and resizing the window such that the window is viewable in its entirety when the display screen orientation is changed (e.g., from portrait to landscape.) A scroll bar may be added to allow full access to content that is not visible within the display screen. Likewise, the scrollbar may be removed if the scrollbar is no longer necessary in the new orientation. The repositioning/resizing of the window, and addition/removal of the scrollbar occurs without interruption of other operating system applications.

Illustrative Operating Environment

Figure 1:
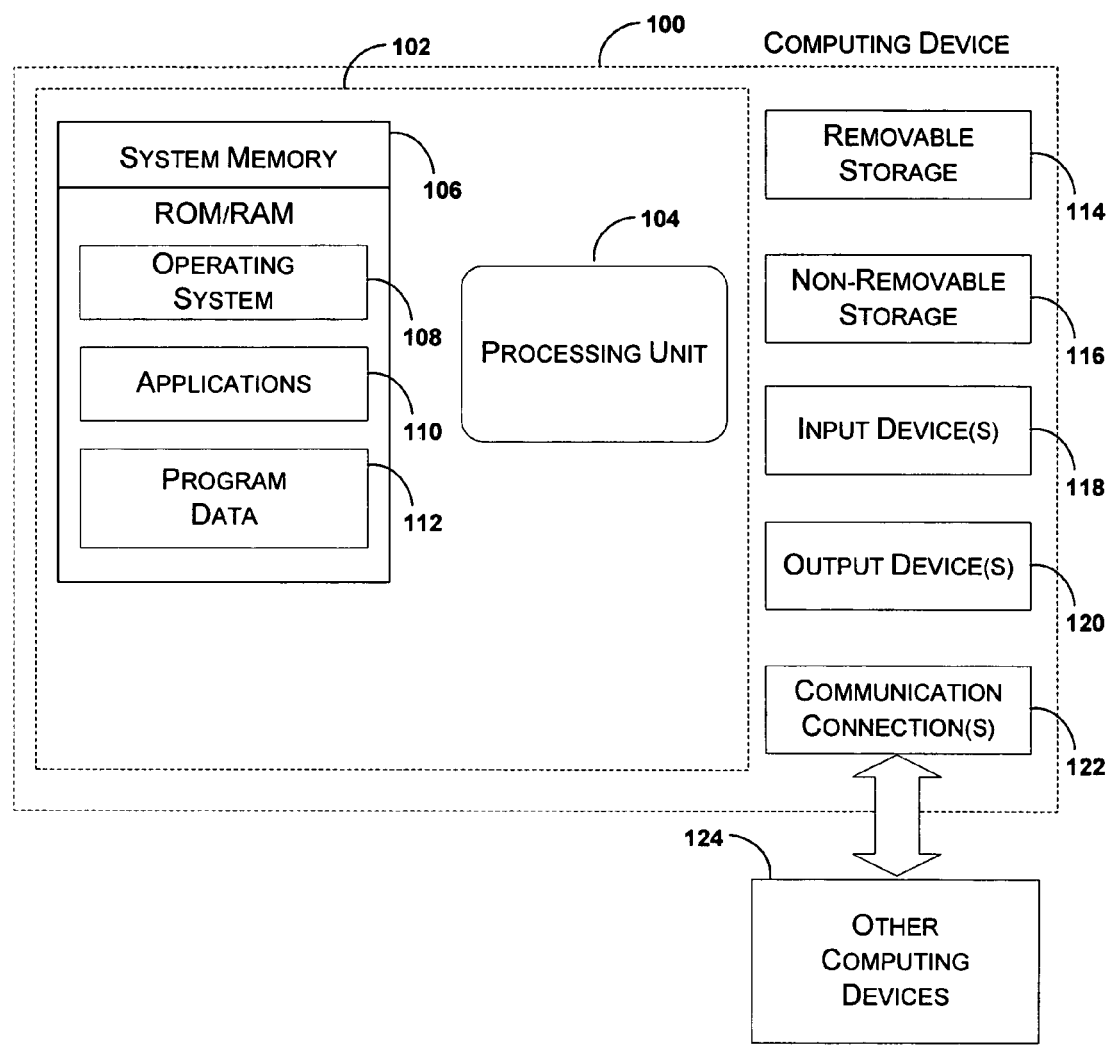
FIG. 1 shows an exemplary computing environment in which the present invention may be implemented.

With reference to FIG. 1, one exemplary system for implementing the invention includes a computing device, such as computing device 100. A basic configuration includes those components within dashed line 102. In the basic configuration, computing device 100 typically includes at least one processing unit 104 and system memory 106. Depending on the exact configuration and type of computing device, system memory 106 may be volatile (such as RAM), non-volatile (such as ROM, flash memory, etc.) or some combination of the two. System memory 106 typically includes an operating system 108, one or more applications 110, and may include program data 112.

Computing device 100 may have additional features or functionality. For example, computing device 100 may also include additional data storage devices (removable and/or non-removable) such as, for example, magnetic disks, optical disks, or a memory stick. Such additional storage is illustrated in FIG. 1 by removable storage 114 and non-removable storage 116. Computer storage media may include volatile and non-volatile, removable and non-removable media implemented in any method or technology for storage of information, such as computer readable instructions, data structures, program modules, or other data. System memory 106, removable storage 114 and non-removable storage 116 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 118 such as keyboard, mouse, pen, voice input device, touch input device, etc. Output device(s) 120 such as a display, speakers, printer, etc. may also be included. These devices are well know in the art and need not be discussed at length here.

Computing device 100 may also contain communication connections 122 that allow the device to communicate with other computing devices 124, such as over a network. Communication connection 122 is one example of communication media. Communication media may typically be embodied by computer readable instructions, data structures, program modules, or other data in a modulated data signal, such as a carrier wave or other transport mechanism, and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Automatic Window Adjustment Mechanism

FIGS. 2-7 illustrate examples of windows that are in a particular position and of a particular size when an orientation change is initiated. The examples illustrated show a change from portrait to landscape. It is understood that the present invention may also be utilized for an orientation change from landscape to portrait without departing from the spirit or scope of the invention.

Each of FIGS. 2-7 illustrates an overlay of a portrait view (e.g., 210) and a landscape view (e.g., 220) of a display screen that includes a window (e.g., 200). The window's size and position within the overlay is also shown. The size and position of some of the windows in FIGS. 2-7 illustrate that in certain circumstances, the window is no longer fully visible after an orientation change.

Accordingly, FIGS. 2-7 also illustrate the new window size, position, and features as implemented by the present invention. The present invention automatically adjusts (as indicated by the large arrow) the size, position, and features of the original window (e.g., 200) to produce a new window (e.g., 230).

Figure 2:
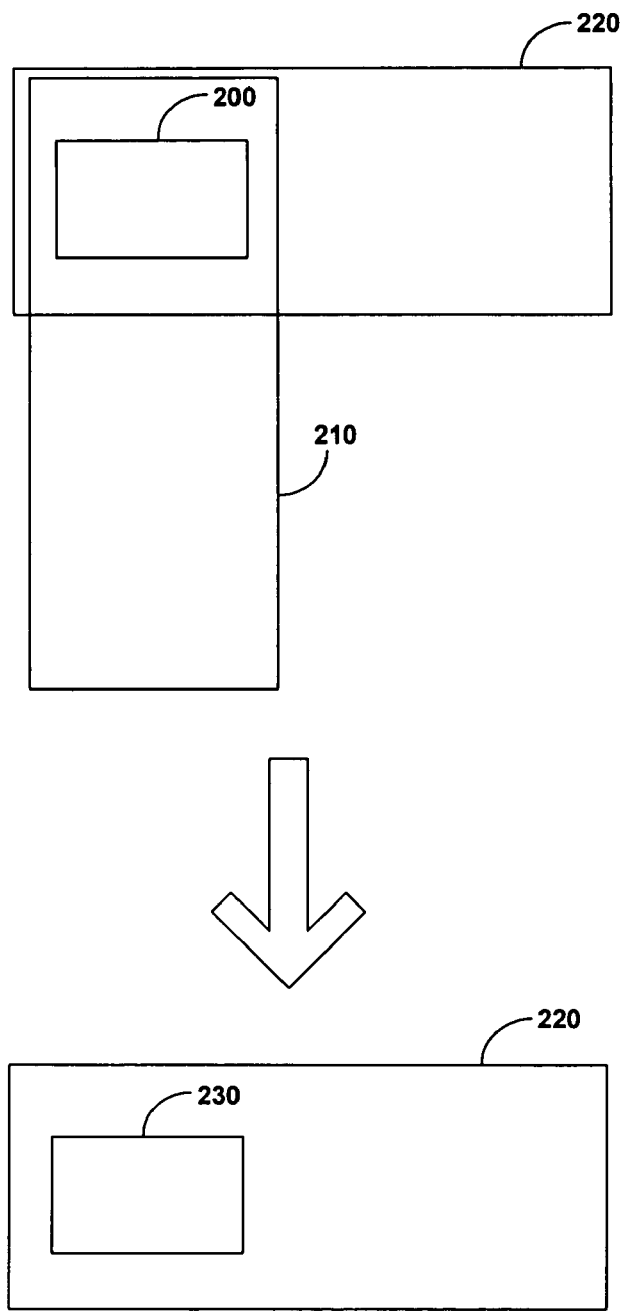
FIG. 2 illustrates a window that is visible within a display screen both before and after the display screen is changed from portrait to landscape in accordance with the present invention.
Figure 3:
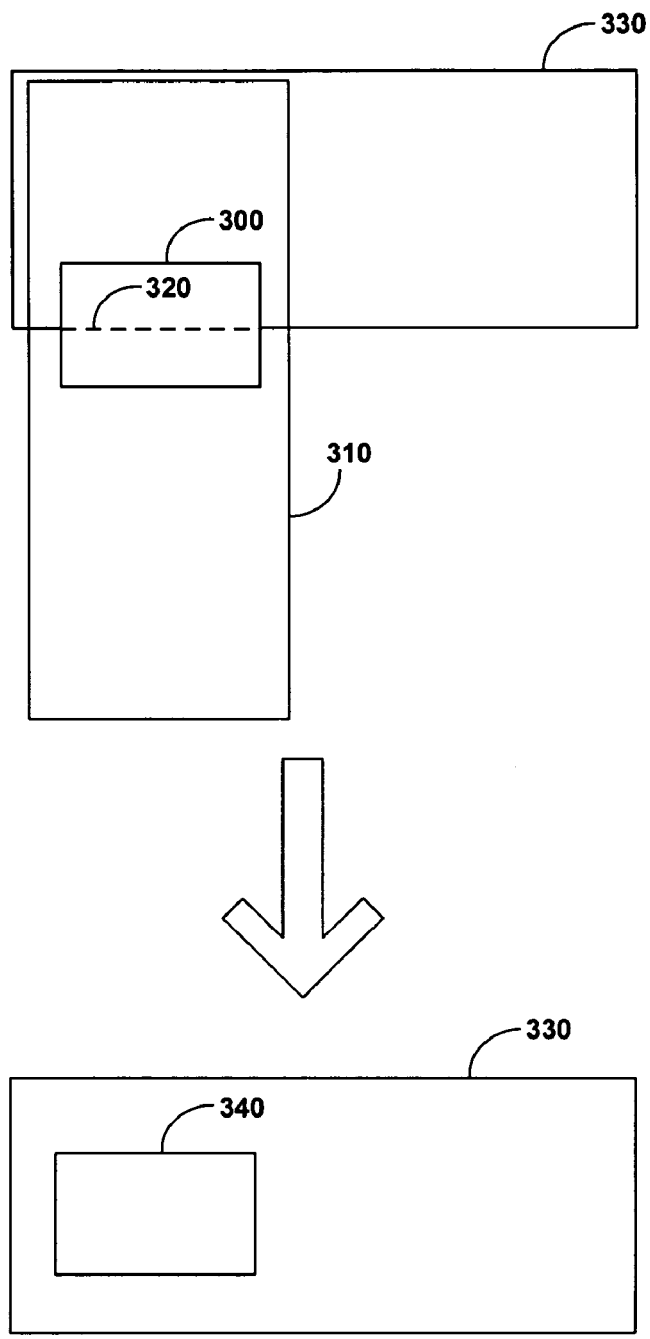
FIG. 3 illustrates a window that is partially visible on the display screen when the orientation of the display screen is changed from portrait to landscape, and a window that has been repositioned in accordance with the present invention.
Figure 4:
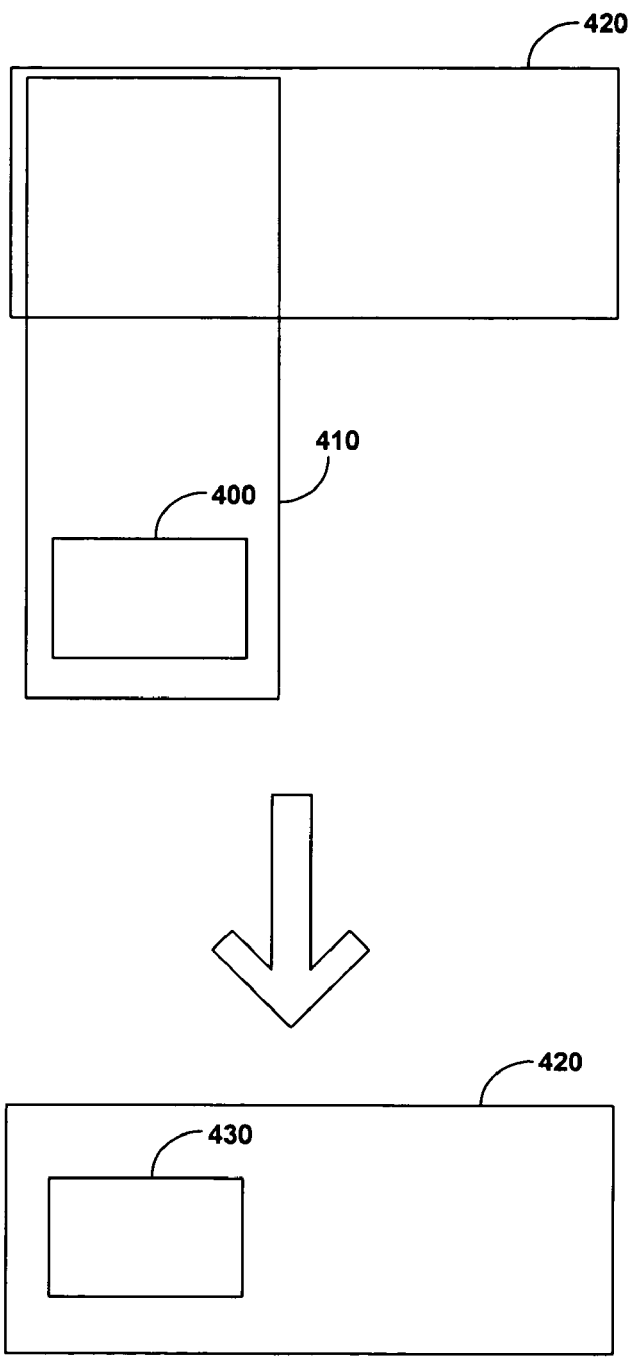
FIG. 4 illustrates a window that is not visible on the display screen when the orientation of the display screen is changed from portrait to landscape, and a window that has been repositioned in accordance with the present invention.
Figure 5:
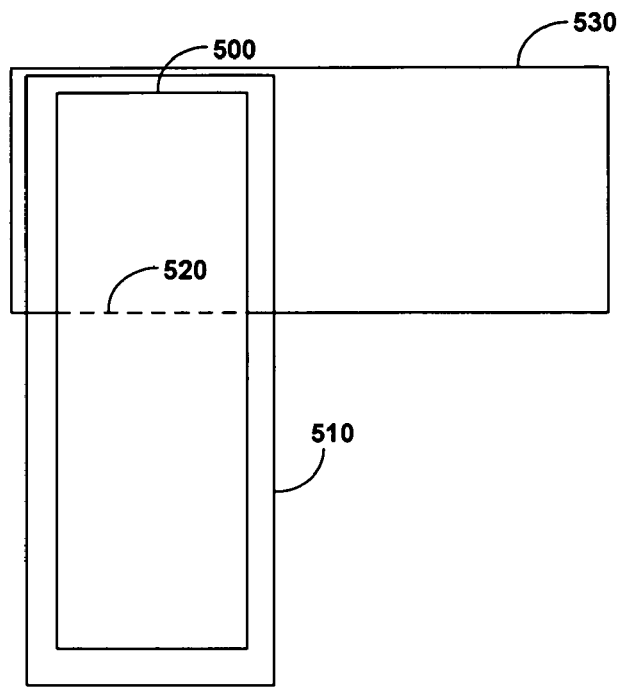
FIG. 5 illustrates a full screen window that is partially visible on the display screen when the orientation of the display screen is changed from portrait to landscape, and a window that has been resized and includes a scrollbar in accordance with the present invention.
Figure 5:
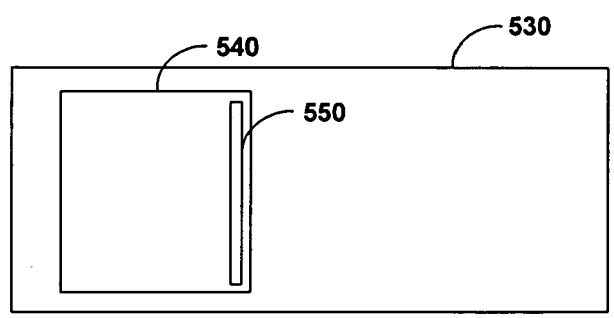
Figure 6:
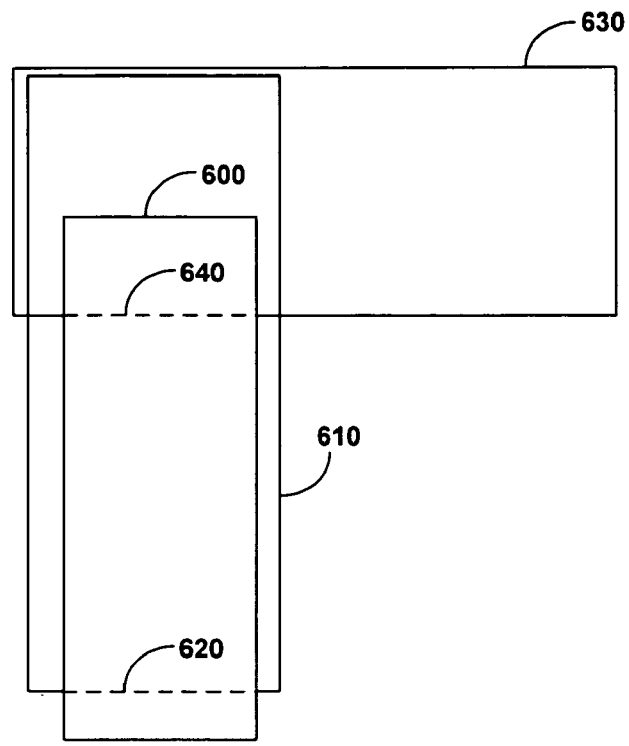
FIG. 6 illustrates a window that is not entirely visible on the display screen when the orientation of the display screen is either portrait or landscape, and a window that has been resized and repositioned and includes a scrollbar in accordance with the present invention.
Figure 6:
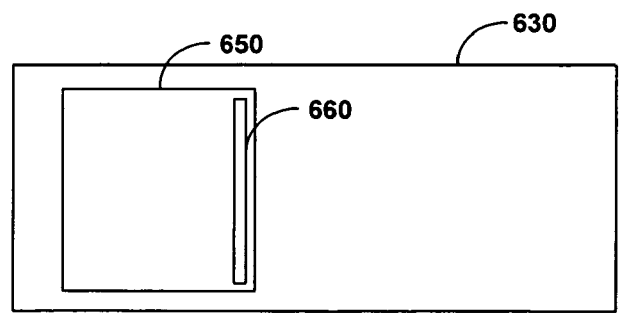
Figure 7:
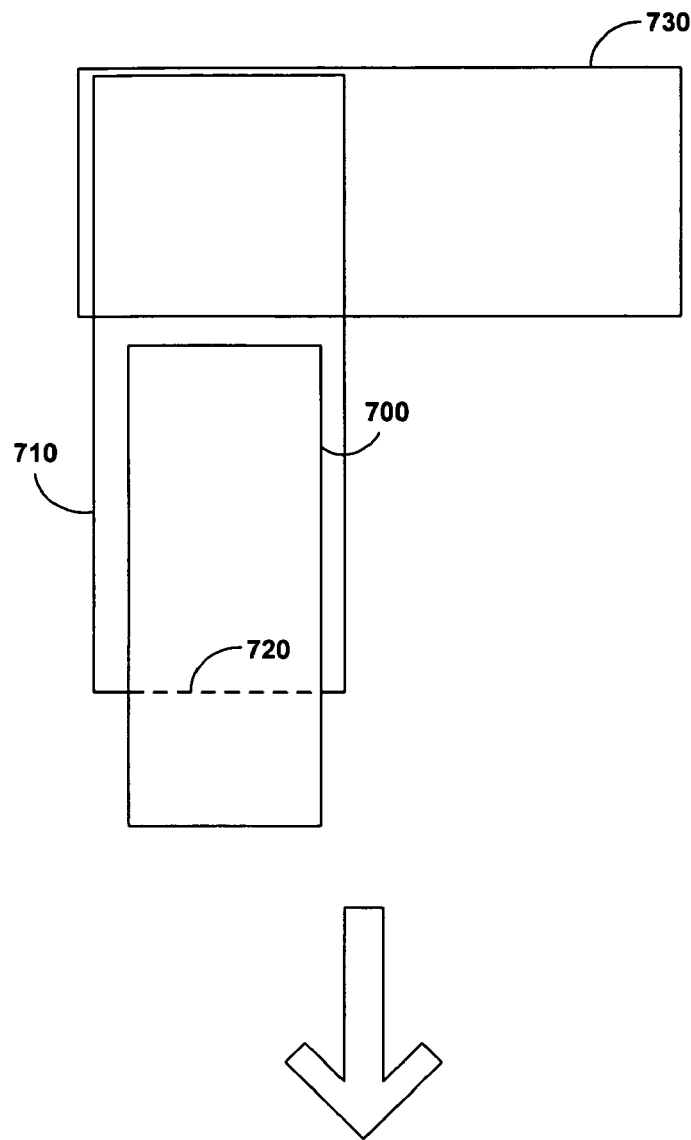
FIG. 7 illustrates a window that is partially visible on the display screen when the orientation of the display screen is portrait and that is not visible on the display screen when the orientation of the display screen is landscape, and a window that has been resized and repositioned and includes a scrollbar in accordance with the present invention.
Figure 7:
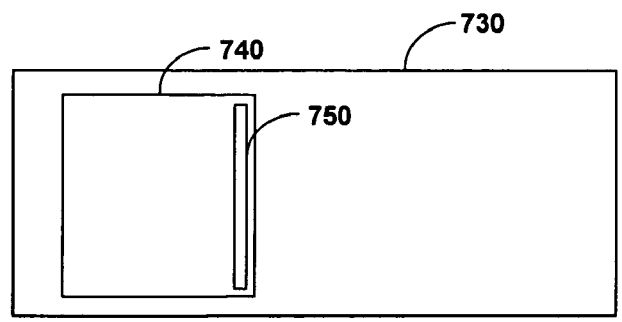

As may further be seen in FIGS. 2-7, certain windows depending on their size and position, may require the insertion of a scroll bar into the window for display of the content. FIGS. 2-4 illustrate windows whose size and position do not require the insertion of a scroll bar. Correspondingly, FIGS. 5-7 illustrate windows whose size and position require the insertion of a scroll bar.

FIG. 2 illustrates a window that is visible within a display screen both before and after the display screen is changed from portrait to landscape. Window 200 is located in the upper portion of the display screen when the display screen has portrait orientation 210. Window 200 is located in the left portion of the display screen when the display screen has landscape orientation 220. Window 200 is completely visible in both display screen orientations 210, 220. Thus, no action is required to fit window 200 in the display screen when the orientation has changed from landscape to portrait. The present invention therefore does not adjust the window properties to obtain new window 230. New window 230 indicates that utilization of the present invention is not necessary to view the window in the new orientation.

FIG. 3 illustrates a window that is partially visible on the display screen when the orientation of the display screen is changed from portrait to landscape. Window 300 is located in the middle portion of the display screen when the display screen has portrait orientation 310. The portion of window 300 above dashed line 320 is located in the lower left portion of the display screen when the display screen has landscape orientation 330. The portion of window 300 below dashed line 320 is not visible on the display screen when the display screen has landscape orientation 330. Thus, in accordance with the present invention, window 300 is repositioned within the display screen having landscape orientation 330 such that the entire window is visible. For example, window 300 can be repositioned to the location of window 340 as shown in the lower portion of FIG. 3.

FIG. 4 illustrates a window that is not visible on the display screen when the orientation of the display screen is changed from portrait to landscape. Window 400 is located in the lower portion of the display screen when the display screen has portrait orientation 410. Window 400 is not visible on the display screen when the display screen has landscape orientation 420. In order to allow user access to window 400, window 400 is repositioned to be located within the display screen having landscape orientation 420. For example, window 400 can be repositioned to the location of window 430 shown in the lower portion of FIG. 4.

FIG. 5 illustrates a full screen window that is partially visible on the display screen when the orientation of the display screen is changed from portrait to landscape. Window 500 essentially fills the entire display screen having portrait orientation 510. However, the portion of window 500 below dashed line 520 is not visible when the orientation of the display screen is changed to landscape orientation 530 because the height of the display screen is now smaller.

To allow user access to the hidden portion of window 500 when the display screen has a landscape orientation, window 500 is resized to take the shape of window 540 as shown in lower portion of FIG. 5. In accordance with the present invention, and vertical scrollbar 550 is added to window 540. Scrollbar 550 allows a user to access the portions of window 540 that are not immediately visible on the display screen.

FIG. 6 illustrates a window that is not entirely visible on the display screen when the orientation of the display screen is either portrait or landscape. Window 600 does not fit within the display screen having portrait orientation 610. The portion of window 600 below dashed line 620 is not visible. Likewise, window 600 does not fit within the display screen having landscape orientation 630. The portion of window 600 below dashed line 640 is not visible on the display screen. In order to allow full user access to window 600, window 600 is repositioned and resized to fit in the display screen having landscape orientation 640, and a scrollbar is added. For example, window 600 can be repositioned and resized to take the form of new window 650 (including scrollbar 660) as shown in the lower portion of FIG. 6.

FIG. 7 illustrates a window that is partially visible on the display screen when the orientation of the display screen is portrait and that is not visible on the display screen when the orientation of the display screen is landscape. Window 700 does not fit within the display screen having portrait orientation 710. The portion of window 700 below dashed line 720 is not visible. Likewise, window 700 is not visible within the display screen having landscape orientation 730. In order to allow user access to window 700, window 700 is repositioned and resized to fit in the display screen having landscape orientation 730, and a scrollbar is added. For example, window 700 can be repositioned and resized to take the form of new window 740 (including scrollbar 750) as shown in the lower portion of FIG. 7.

The present invention is described with reference to a change in display screen orientation from portrait to landscape, however it is understood that the system described can support any change in display screen orientation.

Figure 8:
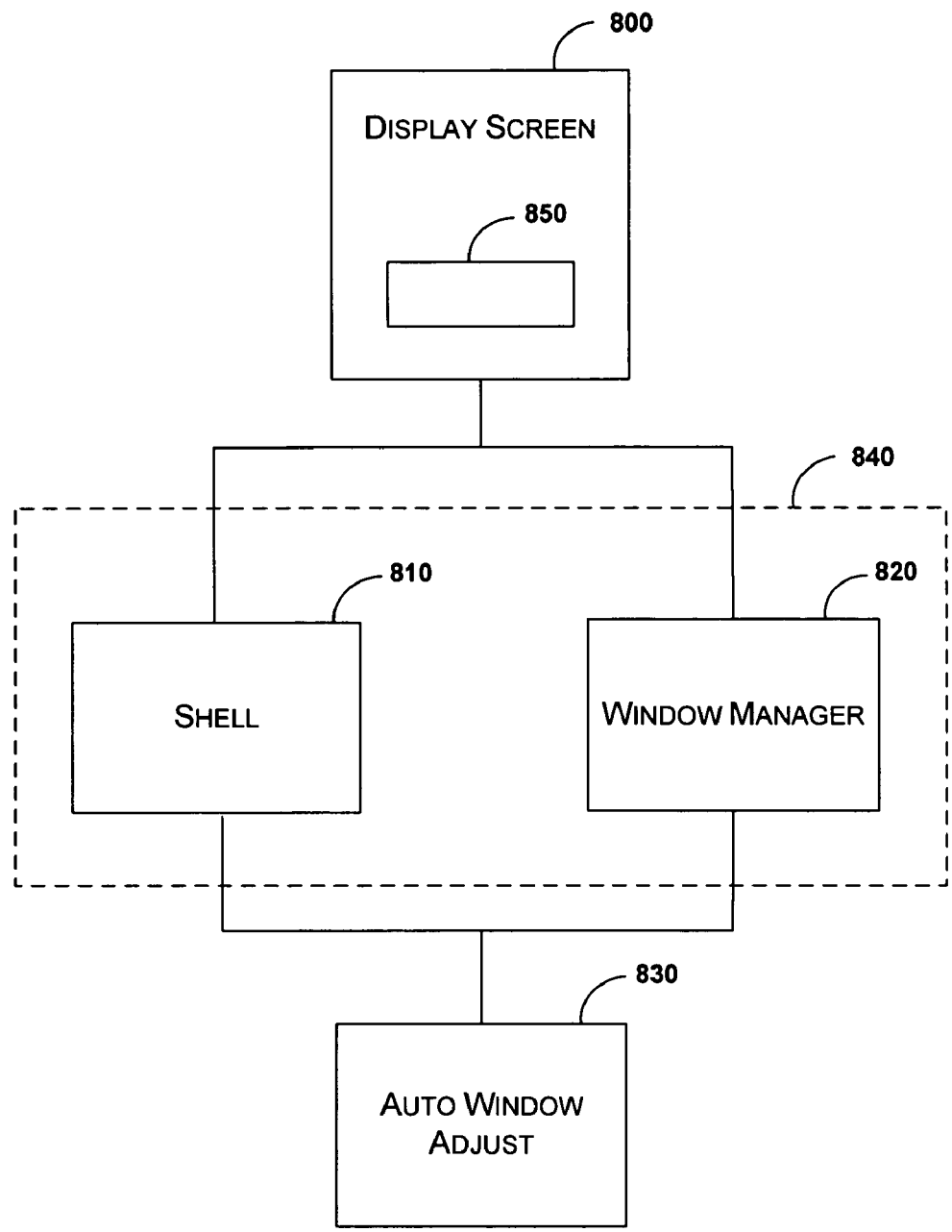
FIG. 8 illustrates an exemplary functional block diagram of a system for automatically displaying content of a window on a display that has changed orientation in accordance with the present invention.

FIG. 8 illustrates an exemplary functional block diagram of a system for automatically adjusting the size, orientation and features of window on a display when an orientation change is initiated in accordance with the present invention. The system includes display screen 800, shell 810, window manager 820, and auto window adjust module 830. Shell 810 and window manager 820 are components of operating system 840. Display screen 800 is the visible portion of a user interface. Auto window adjust module 830 is an application that provides the code for automatically displaying content of a window on a display that has changed orientation.

Shell 810 includes heuristics to determine the rules applied by a window positioning application. The heuristics set forth the "look and feel" of display screen 800 when the orientation is changed. In another embodiment, the heuristics may be included in a different component of operating system 840.

Window manager 820 manages the viewable area of the window and the addition/removal of scrollbars on display screen 800. Window manager 820 controls the operation of the scrollbar when the user wants to scroll up or down a window in the new orientation.

Operating system 840 sends a notification to shell 810 when the orientation of display screen 800 has changed. Shell 810 searches for all top-level windows in the new orientation. The search is performed by class such that all available top-level windows are enumerated. For example, top-level window 850 is located by shell 810.

In one embodiment, the top-level window restriction is removed such that lower-level windows may be found. For example, if the window includes a nested window, the top-level window restriction is removed. A nested window is a window that resides within a window.

Shell 810 determines if window 850 is visible in the new orientation of display screen 800. If the entire window is visible in the new orientation, no action is taken. If all or a portion of window 850 is not visible in the new orientation, shell 810 repositions and, if necessary, resizes window 850.

When window manager 820 receives a notification from shell 810 that a change in the orientation of display screen 800 is occurring, the dimensions of window 850 in the both the old and new orientations of display screen 800 are determined. Before window 850 is repositioned and resized, an application program interface (API) is called to determine the dimensions of the window. For example, shell 810 calls GetWindowRect in auto window adjust module 830 to enumerate the size of window 850.

Shell 810 repositions and resizes window 850 by calculating the visible area of display screen 800 in the new orientation. Window 850 can be resized to cover any portion of the area of display screen 800. In one embodiment, the repositioning and resizing occurs as a result of shell 810 calling a reposition/resize application from auto window adjust module 830. After the reposition/resize application is called, shell 810 requests the vertical height of the viewing area of window 850 from window manager 820. Shell 810 then determines the dimensions of a new window and forwards the new dimensions to window manager 820. Window manager 820 performs the appropriate resizing and repositioning calculations based on the location of window 850 and the orientation of display screen 800. The new window is then positioned within display screen 800 having the new orientation.

Shell 810 sends a scrollbar notification to window manager 820 if the new window requires a scrollbar. The scrollbar notification contains information about any limits of the viewing area on display screen 800. The scrollbar notification also controls the removal or addition of the scrollbar. Since the scrollbar notification is customized, the user may define the boundaries of the viewing area and window manager 820 can scroll up or down to the desired location.

Shell 810 contains information about the viewable area of display screen 800 that the new window may be positioned within after the orientation change. The viewable area of display screen 800 is not a set parameter. In one embodiment, for a pocket computing device, the maximum available viewable space for window 850 is slightly less than the dimensions of display screen 800 to allow room for a menu chrome. The menu chrome can include a task bar or other tools that are frequently accessed by the user. Shell 810 contains information about the contents and location of the menu chrome. Window 850 is usually not displayed where the menu chrome is located, but window 850 could obscure the menu chrome if desired. The reposition/resize application provides flexibility such that window 850 may be resized to any desired dimension.

Shell 810 is an external component that original equipment manufacturers (OEMs) can customize to meet design specifications. Shell 810 is not fixed as to menu chrome dimensions, which adds flexibility to the system. In one embodiment, no menu chrome is displayed. The present invention is described with reference to the shell of a pocket computing device, however it is understood that the system described can support many different shells.

Figure 9:
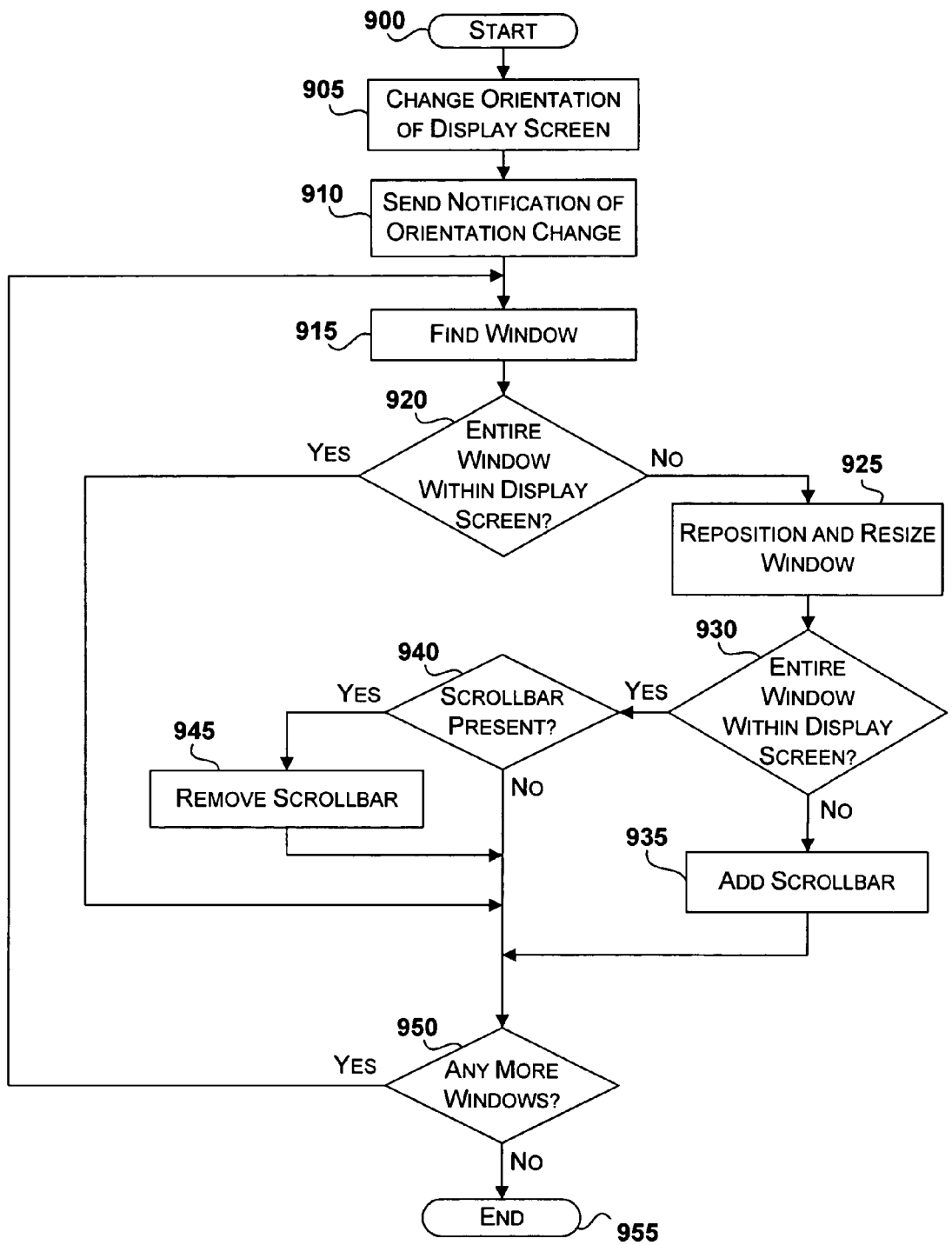
FIG. 9 is an operational flow diagram illustrating a process for automatically displaying content of a window on a display that has changed orientation in accordance with the present invention.

An exemplary process for automatically displaying content of a window on a display that has changed orientation is described with reference to FIG. 9. The process begins at block 900 where the display screen is configured to have a certain orientation, such as landscape or portrait.

At block 905, a change in the orientation of the display screen is initiated. The change in orientation may be user-initiated or automatic. In one embodiment, the change in orientation is from zero degrees to ninety degrees. In one example, the change in orientation of the display screen is from portrait to landscape. Processing moves to block 910. At block 910, the operating system notifies the shell that an orientation change has occurred. Processing then moves to block 915.

At block 915, the shell searches for a top-level window currently open on the system. However, in one embodiment, other lower-level windows may be located. For example, in the case of nested windows, the top-level window restriction is removed. Processing proceeds to decision block 920.

At decision block 920, a determination is made whether the entire window is positioned within the display screen. If the entire window is positioned within the display screen (as shown in FIG. 2), the process flows to decision block 950. However, if any portion of the window is not positioned within the display screen, the process continues at block 925.

At block 925, the window is repositioned and resized to be visible within the limits of the display screen. As shown in FIGS. 3 and 4, only a reposition is necessary if the entire window fits within the display screen after being repositioned. Likewise, only a resize may be necessary. For example, as shown in FIG. 5, the window is already positioned at the upper left corner of the display screen so a reposition is not necessary. When the orientation of the display screen changes from portrait to landscape, both a reposition and a resize are necessary when the vertical length of the window is larger than the vertical width of the display screen, and the window is not located in the upper left corner of the display screen, as shown in FIGS. 6 and 7. When the orientation of the display screen changes from landscape to portrait, both a reposition and a resize are necessary when the horizontal length of the window is larger than the horizontal width of the display screen, and the window is not located in the upper left corner of the display screen. Processing continues at decision block 930.

At decision block 930, a determination is made whether the entire window is positioned within the display screen. If the entire window is not positioned within the display screen the process flows to block 935. However, if the entire window is positioned within the display screen, the process continues at decision block 940.

At block 935, a scrollbar is added to the window. The scrollbar allows a user to access portions of the window that are not immediately visible within the display screen. Processing then moves to decision block 950.

At decision block 940, a determination is made whether a scrollbar is present within the window. If a scrollbar is not present within the window, the process flows to decision block 950. However, if a scrollbar is present within the window, the process continues at block 945.

At block 945, the scrollbar is removed because it is unnecessary. Referring to the lower portion of FIG. 6, a window with a scrollbar is shown within a display screen having a landscape orientation. Changing the orientation to portrait would result in the configuration shown in the upper right portion of FIG. 6. As shown in the diagram, the entire window is visible within the display screen. Thus, the scrollbar is not necessary for full display of the window content. Processing then moves to decision block 950.

At decision block 950, a determination is made whether any more windows are open. If a window is open that requires repositioning/resizing or the addition/removal of a scrollbar, the process returns to block 915 to repeat the process. If no open windows exist, processing ends at block 955.

FIG. 10 illustrates exemplary code for a mechanism to automatically display content of a window on a display that has changed orientation in accordance with the present invention. A command to find a window that requires resizing and/or repositioning is executed (e.g., 1000). The window manager receives the window to be resized and/or repositioned (e.g., 1010). A determination is made whether a scroll bar should be added (e.g., 1020). The size of the window is determined (e.g., 1030). A pointer is positioned at the window (e.g., 1040). The size of the window is then changed. In the example shown, the size of the window is made smaller by 80 pixels (e.g., 1050). A scrollbar may then be added (e.g., 1060).

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for automatically adjusting a window displayed within a display screen in response to a change in display orientation, the computer-implemented method comprising:

providing a display screen having a first orientation, wherein the display screen includes the window;

receiving an indication that the display screen has been changed from the first orientation to a second orientation; and in response to the indication that the display screen has been changed from the first orientation to the second orientation, automatically making a first determination of whether the window fits within the display screen, automatically spatially adjusting the window when the first determination indicates that the window does not fit within the display screen, wherein spatially adjusting the window includes adjusting the size of the window and adjusting the position of the window, automatically displaying the window without spatially adjusting the window when the first determination indicates that the window fits within the display screen, automatically making a second determination of whether the window fits within the display screen after spatially adjusting the window when the first determination indicates that the window does not fit within the display screen, automatically displaying the window without a scroll bar when the window fits within the display after being spatially adjusted when the first determination indicates that the window does not fit within the display screen, and automatically displaying the window with a scroll bar when the window does not fit within the display after being spatially adjusted when the first determination indicates that the window does not fit within the display screen.

2. The computer-implemented method of claim 1, wherein the display screen is a hardware display screen of a mobile computing device, wherein the hardware display screen is movable from the first orientation to the second orientation.

3. The computer-implemented method of claim 2, wherein the first orientation is a portrait orientation and the second orientation is a landscape orientation.

4. The computer-implemented method of claim 2, wherein the first orientation is a landscape orientation and the second orientation is a portrait orientation.

5. The computer-implemented method of claim 1, wherein displaying the window without the scroll bar when the window fits within the display screen includes removing the scroll bar before being displayed.

6. A computer-readable storage medium having computer executable instructions for automatically adjusting a window displayed on a display screen, the instruction comprising:

changing the display screen from a first orientation to a second orientation; and in response to receiving an indication that the display screen has been changed from the first orientation to the second orientation, automatically making a first determination of whether the window fits within the display screen, spatially adjusting the window when the first determination indicates that the window does not fit within the display screen, wherein spatially adjusting the window includes adjusting the size of the window and adjusting the position of the window, displaying the window without spatially adjusting the window when the first determination indicates that the window fits within the display screen, making a second determination of whether the window fits within the display screen after spatially adjusting the window when the first determination indicates that the window does not fit within the display screen, displaying the window without a scroll bar when the window fits within the display after being spatially adjusted when the first determination indicates that the window does not fit within the display screen, and displaying the window with a scroll bar when the window does not fit within the display after being spatially adjusted when the first determination indicates that the window does not fit within the display screen.

7. The computer-readable storage medium of claim 6, wherein the indication includes an indication from a hardware display screen of a mobile device that is movable from the first orientation to the second orientation.

8. The computer-readable storage medium of claim 7, wherein the first orientation is a portrait orientation and the second orientation is a landscape orientation.

9. The computer-readable storage medium of claim 7, wherein the first orientation is a landscape orientation and the second orientation is a portrait orientation.

10. The computer-readable storage medium of claim 6, wherein displaying the window without the scroll bar when the window fits within the display screen includes removing the scroll bar before being displayed.

11. A system for automatically adjusting a window, the system comprising:

a processor;

a display for displaying a window on a mobile computing device, wherein the display is movable from a first orientation to a second orientation; and a memory having computer executable instructions stored thereon, wherein the computer executable instructions are configured to:

receive an indication that the display has been moved from the first orientation to the second orientation, in response to receiving the indication that the display has been changed from the first orientation to the second orientation, automatically make a first determination of whether the window fits within the display, spatially adjust the window when the first determination indicates that the window does not fit within the display, wherein spatially adjusting the window includes adjusting the size of the window and adjusting the position of the window, display the window without spatially adjusting the window when the first determination indicates that the window fits within the display, make a second determination of whether the window fits within the display after spatially adjusting the window when the first determination indicates that the window does not fit within the display, display the window without a scroll bar when the window fits within the display after being spatially adjusted when the first determination indicates that the window does not fit within the display, and display the window with a scroll bar when the window does not fit within the display after being spatially adjusted when the first determination indicates that the window does not fit within the display.

12. The system of claim 11, wherein the first orientation is a portrait orientation and the second orientation is a landscape orientation.

13. The system of claim 11, wherein the first orientation is a landscape orientation and the second orientation is a portrait orientation.

14. The system of claim 11, wherein displaying the window without the scroll bar when the window fits within the display screen includes removing the scroll bar before being displayed.

* * * * *